(12) United States Patent
Chatterjee et al.

(10) Patent No.: US 7,695,532 B2
(45) Date of Patent: Apr. 13, 2010

(54) PROCESS FOR MAKING BIODIESEL FROM CRUDE TALL OIL

(75) Inventors: Siddarth G. Chatterjee, Syracuse, NY (US); Shigetoshi Omori, Syracuse, NY (US); Swapnil Marda, Syracuse, NY (US); Shiri Shastri, Syracuse, NY (US)

(73) Assignee: The Research Foundation of State University of New York, Albany, NY (US)

( * ) Notice: Subject to any disclaimer, the term of this patent is extended or adjusted under 35 U.S.C. 154(b) by 349 days.

(21) Appl. No.: 11/600,394

(22) Filed: Nov. 16, 2006

(65) Prior Publication Data

US 2007/0130820 A1    Jun. 14, 2007

Related U.S. Application Data

(60) Provisional application No. 60/737,193, filed on Nov. 16, 2005.

(51) Int. Cl.
   *C10L 1/10*   (2006.01)
   *C10L 1/18*   (2006.01)
   *C10L 1/22*   (2006.01)
(52) U.S. Cl. ............................. 44/306; 44/308; 44/354
(58) Field of Classification Search .................. 44/418, 44/306, 386, 308, 354, 419; 554/175; 106/164.3
See application file for complete search history.

(56) References Cited

U.S. PATENT DOCUMENTS

| 3,208,864 | A | * | 9/1965 | Glab | ........................ 106/164.3 |
| 2005/0085653 | A1 | * | 4/2005 | Garro et al. | ................. 554/175 |
| 2005/0160662 | A1 | * | 7/2005 | Jordan | ......................... 44/329 |

FOREIGN PATENT DOCUMENTS

| WO | WO2004074233 | * | 9/2004 |
| WO | WO 2007/050030 A1 | | 5/2007 |

* cited by examiner

*Primary Examiner*—Michael A Marcheschi
*Assistant Examiner*—Chantel Graham
(74) *Attorney, Agent, or Firm*—Scully, Scott, Murphy & Presser, P.C.

(57) ABSTRACT

A process of making biodiesel from crude tall oil by reacting crude tall oil with a $C_1$-$C_6$ alkanol in the presence of an acid catalyst or by reacting crude tall oil with an acyl halide in the presence of a $C_1$-$C_6$ alkanol. The reaction product of either of these reactions is separated into a suspension liquid by the addition of a polar liquid. The biodiesel product is recovered from the suspension liquid by addition of an organic solvent which produces a polar liquid phase and an organic liquid phase. The biodiesel is recovered from the organic liquid phase by evaporating the organic solvent, which is recovered for use in subsequent separation processes, and vacuum distilling off the product biodiesel from the organic solvent-free organic liquid phase.

18 Claims, No Drawings

PROCESS FOR MAKING BIODIESEL FROM CRUDE TALL OIL

This application claims priority under 35 U.S.C. §119(e) of U.S. provisional patent application Ser. No. 60/737,193, entitled "Process for Making Biodiesel From Crude Tall Oil", filed Nov. 16, 2005, the complete disclosure of which is hereby incorporated by reference for all purposes.

BACKGROUND OF THE DISCLOSURE

1. Field of Invention

The present invention is directed to a process for producing biodiesel from crude tall oil (CTO). More specifically, the present invention is directed to a process for producing biodiesel by acid catalyzed reaction with alcohol, or by acyl halide reaction of CTO. This alternate reaction step is followed by separation and purification of the biodiesel product by solvent extraction and vacuum distillation.

2. Background of the Prior Art

Biodiesel, which is a term encompassing lower alkyl esters of fatty acids, especially methyl and ethyl esters of fatty acids, is currently the subject of much attention because it is a clean, renewable and biodegradable replacement fuel for conventional diesel fuel. This interest is based on the capability of biodiesel to serve as a complete or partial, e.g. blending with conventional diesel fuels, replacement of diesel fuel.

At present, production of biodiesel is limited to that obtained from the processing of vegetable oils and animal fats in which triglycerides found in those materials are transesterified, by reaction with methanol or ethanol in the presence of a base catalyst, such as sodium or potassium hydroxide, an acid catalyst, such as sulfuric acid, or an enzyme, such as lipase. These processes of producing biodiesel provide an additional benefit, it also yields glycerin, a commercially important compound, as a by-product.

Biodiesel, produced by one of these prior art processes, yields inadequate volume given its effectiveness as a diesel engine fuel. The combustion of biodiesel results in significantly lower emissions of carbon dioxide, particulates and unburned hydrocarbons compared to the emissions resulting from the combustion of conventional diesel fuel. As such, the use of biodiesel provides improved air quality results. Moreover, biodiesel, being a potentially carbon-neutral fuel, aids in amelioration of the greenhouse effect.

Crude tall oil (CTO) is generated during the kraft pulping process. During this process reacted resins obtained from wood are decanted from black liquor before an evaporation process. The decant is denoted as crude tall oil soap. This tall oil soap is decanted from spent cooking liquor in a soap separator. The soap is treated, such as by reaction with carbon dioxide, to produce CTO.

The annual global production of tall oil is about 1.6 million metric tons. Indeed, tall oil supplies about two thirds of the fatty acids used in the United States for industrial purposes. This large production of tall oil is not readably marketable due to weak demand for the prior art products produced from CTO. As a result, there has been a increasing inventory build-up of CTO insofar as the specialty products, into which CTO is presently converted by chemical companies, cannot economically be transmitted to chemical processing plants which are usually located at considerable distances from kraft pulping mills. As such, CTO, which is very viscous, malodorous and sticky, finds itself to be a low value product. This is magnified by the availability of alternative raw materials to produce rosins and varnishes, the products into which CTO was principally converted in the past.

The above remarks emphasize the confluence of a strong need in the art for both a new source of biodiesel and a new utility for CTO.

As stated above, biodiesel is presently produced from vegetable oil (VO), waste vegetable oil (WVO) and fats. Biodiesel is presently produced from any one of these products either by base or direct acid catalyzed transesterification with an alcohol or by conversion to fatty acids and then to alkyl esters with an acid catalyst. Of these methods, base catalyzed transesterification is most common.

Ma et al., *Bioresource Tech.*, 70, 1 (1999) report that the transesterification of glycerides in VO/WVO with an alcohol to produce biodiesel is affected by the glycerides to alcohol molar ratio, reaction time and temperature and the free fatty acid and water content of the vegetable oil or fat.

The prior art includes a series of studies wherein such vegetable oils as soybean oil, sunflower oil, rapeseed oil, palm oil and WVO have been successfully employed in the production of biodiesel.

Additional studies have been conducted to characterize properties of biodiesel and engine emission tests utilizing biodiesel fuel. The conclusions drawn from these studies are that biodiesel serves as a very good substitute for conventional diesel fuel. Indeed, biodiesel is used in the same applications as diesel oil and has been found to have fuel properties similar to or even superior to traditional diesel oil. However, biodiesel provides the added benefits that its source is renewable and that it produces significantly lower emissions of pollutants.

There is very little prior art directed to the production of biodiesel from CTO. Liu et al., *Petrol Sci. & Tech.*, 16 (5-6), 597 (1998) developed a process for producing a diesel oil additive, not biodiesel, from pine oil. That process produced a diesel oil cut which was blended with a base diesel fuel. That blended fuel was subsequently used in road and emissions tests.

The web site of Canadian Renewable Fuels Assn. mentions hydrotreating as a means of converting CTO into biofuels and fuel additives. However, this process is a hydrogenation process which produces hydrocarbon products rather than biodiesel.

Coll et al., *Energy & Fuels*, 15, 1166 (2001) describe the conversion of the rosin acid fraction of CTO by means of catalytic hydrotreatment into a diesel fuel additive. This process requires high hydrogen pressures of between 100 to 150 bars and elevated temperature of between 350° C. and 400° C. As such, this process is suitable for sophisticated oil refineries only. Although the process of Coll et al. does not employ an esterification process, it is believed to be the only prior art process that suggests the possibility of esterifying the rosin acid fraction of CTO. However, no specifics for such a process are provided.

BRIEF SUMMARY OF THE INVENTION

A new process has now been developed which exploits the established need in the art to better utilize CTO by converting it, for the first time, to biodiesel, the need for the increased production of which has also been established.

In accordance with the present invention a biodiesel reaction product is obtained by either of two reaction schemes. In the first scheme CTO is converted to biodiesel by reaction of a $C_1$-$C_6$ alkanol in the presence of an acid catalyst. This reaction may be conducted by refluxing the reaction mixture at a temperature of at least the boiling temperature of the alkanol during which time the water product of this reaction is continuously removed. Alternatively, this reaction scheme may be conducted in a closed system at a temperature of at least the boiling point of the alkanol.

In an alternate reaction scheme CTO is contacted with an acyl halide in the presence of $C_1$-$C_6$ alkanol wherein the reaction mixture is disposed in a closed vessel contained in a cooling bath. On addition of the acyl halide, the cooling bath is removed. The closed vessel holding the reaction mixture is then heated at a temperature of at least about 55° C. until the reaction is complete and a biodiesel reaction product is formed.

The biodiesel reaction product of each of the aforementioned reaction schemes is contacted with a volume of a polar liquid at least about equal to the volume of the biodiesel reaction product. This results in the formation of a liquid suspension. This liquid suspension is contacted with an organic solvent which results in the formation of a two-phase liquid mixture: an organic liquid phrase; and a polar liquid phase. The organic liquid phase, which may be supplemented with additional volume obtained by contacting the polar liquid phase with the organic solvent, is evaporated to remove and recover the organic solvent. The biodiesel product is recovered by vacuum distillation of the organic solvent-free product of the organic liquid phase evaporation.

DETAILED DESCRIPTION OF THE INVENTION

Crude tall oil (CTO), a product obtained in the conversion of wood to paper, is primarily a mixture of acids. Among this mixture of acids, oleic, linoleic and abeitic acids are principal constituents. As such, CTO is distinguished from vegetable oil, crude vegetable oil and fats, the principal sources employed in the prior art to produce biodiesel. All of these major prior art sources are principally esters. Therefore, processes employed in the prior art to produce biodiesel cannot be completely emulated to produce biodiesel. For example, the principal method employed in the prior art to convert vegetable oil, crude vegetable oil, fats and the like into biodiesel is by base catalyzed transesterification with an alcohol wherein biodiesel is produced along with the by-product, glycerin. Such a process, if emulated with CTO, would result in the base catalyst reacting with the CTO to produce soap as the main product and water, instead of glycerin as a by-product. As a result, based on known prior art, CTO has not previously been utilized as a source of biodiesel.

To produce biodiesel in accordance with the present invention either of two reaction schemes is utilized. In the first scheme, in a first embodiment of the present invention, CTO is reacted with an alcohol, preferably a $C_1$-$C_6$ alkanol. More preferably, the alkanol is methanol, ethanol or propanol. Most preferably, the alkanol is methanol. This reaction is catalyzed by an acid catalyst. Although substantially any acid may be utilized as the catalyst, commercially available acids, such as sulfuric acid, hydrochloric acid and the like, are preferred. Of these acids, sulfuric acid is particularly preferred.

The reaction between CTO and the alkanol occurs at a temperature of at least the boiling point of the alkanol so that the reaction mixture can be refluxed. In a preferred embodiment, the reflux temperature is in the range of between about 55° C. and about 120° C. More preferably, the reflux temperature is between about 60° C. and about 110° C. Still more preferably, the reflux temperature is between about 65° C. and about 100° C. The duration of the reaction is no more than about 2 hours. Preferably, the reflux reaction occurs over a period of between about 1 hour and about 2 hours. In a preferred embodiment, the reflux reaction occurs at a temperature of about 65° C. for a period of about 1 hour.

An important aspect of the reflux operation is the inclusion of water removal means. This is critically important insofar as the reaction of CTO and methanol produces biodiesel and water as products. By removing water, one of the products of the reaction, the reaction is allowed to continue, increasing the yield of biodiesel.

Water removal means during reflux can be provided by water absorbing agents which are provided in communication with the refluxed water. Thus, such water absorbing agents as activated carbon, activated charcoal, silica gel, molecular sieves and the like may be so employed.

In a second embodiment of the first reaction scheme the same CTO and alkanol reactants are mixed with an acid catalyst in a closed system and are heated to a temperature at or above the boiling temperature of the alkanol at ambient pressure for a period of no more than about 2 hours, preferably about 1 hour, to produce biodiesel. This second embodiment requires no reflux. In a preferred embodiment, the temperature at which the reaction mixture is heated is in the range of between about 55° C. and about 90° C., over a period of between about 30 minutes and about 2 hours and more preferably, between about 60° C. and about 75° C. over a period of between about 45 minutes and about 1½ hours.

The second reaction scheme for producing biodiesel involves reacting CTO with an acyl halide having the structural formula RCOX, where R is an hydrocarbyl group; and X is a halogen atom. Preferably R is a $C_1$-$C_6$ alkyl; and X is chlorine or bromine. More preferably, R is methyl or ethyl. Thus, in particularly preferred embodiments, the acyl halide is acetyl chloride or acetyl bromide.

In the second reaction scheme, the reactants, the CTO and the acyl halide, are contacted under conditions which discourages immediate reaction. To effective this aim, the acyl halide is slowly added, at low temperature, to the CTO, which is suspended or dissolved in a $C_1$-$C_6$ alkanol. In a preferred embodiment, the acyl halide is added to the CTO in the $C_1$-$C_6$ alkanol at a temperature in the range of between about −10° C. and about 10° C. More preferably, a cooling bath, maintained at a temperature of about 0° C., surrounds the closed vessel holding the CTO. The acyl halide is preferably dropwise added to the closed vessel in the cooling bath.

Upon completion of the introduction of the desired quantity of acyl halide, the cooling bath is removed. However, the closed nature of the system of the reactants in $C_1$-$C_6$ alkanol is undisturbed. The closed vessel is thereupon preferably heated to a temperature in the range of between about 25° C. and about 100° C. for a period of between about 30 minutes and about 2 hours. More preferably, the temperature is in the range of between about 55° C. and about 70° C. over a period of between about 45 minutes and about 1½ hours. Still more preferably, the reaction temperature is about 55° C., conducted over a period of about 1 hour.

The $C_1$-$C_6$ alkanol, which in this reaction scheme acts as a suspending agent or solvent, is identical to the $C_1$-$C_6$ alkanol employed in the first reaction scheme, albeit in the first reaction scheme the $C_1$-$C_6$ alkanol is a reactant. Thus, in a preferred embodiment, the $C_1$-$C_6$ alkanol is methanol, ethanol or propanol. Again, the $C_1$-$C_6$ alkanol is more preferably methanol.

Independent of whether the first or second reaction scheme is employed, the product of either reaction is a liquid suspension insofar as the reaction products are polar and non-polar species. To recover the desired biodiesel product, the polar and non-polar products must be separated. To accomplish this a polar solvent, preferably water, is added to the reaction product. In a preferred embodiment, the volume of the polar solvent, usually water, added to the reaction mixture is at least equal to the volume of the reaction mixture. In a preferred embodiment, a volume of water up to about three times that of reaction mixture is added thereto. In a particularly preferred embodiment, a volume of water equal to about two times the volume of the reaction product is added thereto.

The product of this polar liquid, preferably water, addition is a liquid suspension. An organic solvent is next added to the liquid suspension. This addition effects the formation of a two-phase liquid mixture: an organic liquid phase, rich in biodiesel; and a polar liquid, preferably aqueous, phase. The organic liquid phase is evaporated to remove and recover the organic solvent which is reused in subsequent biodiesel recovery operations. The biodiesel product is recovered from the organic solvent-free organic liquid phase by vacuum distillation which, in a preferred embodiment, is conducted at a pressure of about 2 mm Hg. The fraction below about 200° C. is collected as the biodiesel product.

In order to maximize recovery of the biodiesel product, biodiesel present in the biodiesel-poor polar liquid phase is recovered. This is accomplished by adding an additional volume of the organic solvent to the polar liquid phase to again produce an organic liquid phase and a polar liquid phase. This second organic liquid phase is added to the organic liquid phase obtained by the organic liquid solvent addition to the reaction product prior to the removal of the organic solvent therefrom.

In a particularly preferred embodiment, yet another contact of the polar liquid phase, produced by the second addition of the organic solvent, with a third addition of the organic liquid solvent is conducted to produce yet additional organic liquid phase. This additional organic liquid phase is added to the first two organic liquid phases. At this point the combined yield of organic liquid phase is evaporated to remove the organic solvent and vacuum distilled to provide the biodiesel product. Such a process usually yields a recovery of about 50% by weight, based on the weight of the CTO reacted.

The organic solvent employed in the very important step of recovery of the biodiesel product is preferably ethyl acetate, methylene chloride, ethylene chloride, chloroform, hexane, ether, petroleum ether or the like. Of these organic solvents, ethyl acetate is particularly preferred.

The following examples are given to illustrate the present invention. Since these examples are provided for illustrative purposes only, the present invention should not be deemed limited thereto.

EXAMPLE 1

Acid Catalyzed Conversion of Crude Tall Oil to Biodiesel Using Reflux

Crude tall oil (150 g), methanol (350 ml) and concentrated sulfuric acid (3 ml) were disposed and mixed in a 1-liter round bottomed flask attached to a Soxhlet® extractor containing molecular sieve and activated carbon. The contents of the reaction mixture were refluxed for 1 hour at a bath temperature of 100° C.

Water (700 ml) was added to the resultant reaction product producing a suspension liquid. The suspension liquid was contacted with ethyl acetate (300 ml). This step resulted in the formation of bottom aqueous liquid phase and a top organic liquid phase.

The top organic liquid phase was recovered and saved. The bottom aqueous phase was contracted with ethyl acetate to produce another two phase mixture. The organic liquid phase was recovered and added to the saved organic liquid phase of the first ethyl acetate contacting step. Finally, the aqueous liquid phase was contacted with ethyl acetate in a third contacting step and the third organic liquid phase was added to the recoveries of the first two ethyl acetate contacting steps. The third formed aqueous liquid phase was discarded.

The combined organic liquid phases of the three ethyl acetate extractions were evaporated to drive off the ethyl acetate extracting agent. The resultant extract-free organic phase was distilled under vacuum (2 mm Hg) and the fraction below 200° C. was collected as the biodiesel product.

The biodiesel product was obtained in a yield of 83.4 g, providing a yield of 55.5% by weight, based on the weight of the crude tall oil originally reacted.

EXAMPLE 2

Acid Catalyzed Conversion of Crude Tall Oil to Biodiesel Using a Closed System

Crude tall oil (150 g), methanol (350 ml) and concentrated sulfuric acid (3 ml) were introduced and mixed in a 1-liter round-bottomed flask. The flask was then heated for 1 hour at 65° C.

Upon cooling the resultant product, the procedure set forth in Example 1 was repeated. The biodiesel product recovered weighted 79.43 g, representing a yield of 53.0%, based on the weight of crude tall oil reacted.

EXAMPLE 3

Acid Catalyzed Conversion of Crude Tall Oil to Biodiesel Using Reflux

Crude tall oil (150 g), method and concentrated sulfuric acid (3 ml) were mixed in a 1-liter round-bottomed flask closed tightly with a stopper. The flask was then heated at 55° C. for 1 hour. After the heating step the methanol was recovered under atmospheric or lower pressure. A recovery of 65% to 85% of the original methanol charge was obtained.

The remainder of reaction product of the heating step was dissolved in ethyl acetate (500 ml), the solution moved to a separation funnel and washed with water (100 ml). The washing step was repeated two additional times.

The resultant organic phase was dried with sodium sulfate. After concentration and recovery of the ethyl acetate, wherein the recovery was 65% to 85% the residual was distilled under a vacuum (a pressure of 2 mm Hg) and the fraction in the temperature range of 160° C. to 200° C. was collected as biodiesel. The yield of biodiesel was 79.9 g. which represented 53.3% by weight of the original crude tall oil charge.

EXAMPLE 4

Acyl Halide Conversion of Crude Tall Oil to Biodiesel

Crude tall oil (150 g) was suspended in methanol (350 ml) in a 1-liter round bottomed flask into which acetyl chloride (10 ml) was added dropwise from an attached funnel. During this addition, the flask's contents were cooled in a water bath maintained at 0° C. After the addition, the cooling bath was removed and the flask, tightly closed with a stopper, was heated at 55° C. for 1 hour. After the reaction was over, water (700 ml) was added to the reaction mixture and the procedure enumerated in Example 1 was repeated.

The biodiesel yield in this example was 91.1 g, representing a yield of 60.7% by weight, based on the weight of the CTO charged into the flask.

EXAMPLE 5

Acyl Halide Conversion of Crude Tall Oil to Biodiesel

Example 4 was identically repeated except that the amount of methanol initially charged was 500 ml and the amount of acetyl chloride added dropwise was 100 ml.

The yield of biodiesel recovered in this example was 98.9 g, representative of a yield of 65.9%, based on the weight of the crude tall oil originally reacted.

EXAMPLE 6

Acyl Halide Conversion of Crude Oil to Biodiesel

Crude tall oil (150 g) was suspended in methanol (350 ml) in a 1-liter round bottomed flask into which a acetyl chloride (10 ml) was added dropwise from an attached funnel. During this addition the flask contents were cooled with a water bath maintained at a temperature below ambient. After the addition, the cooling bath was removed and the flask was closed tightly with a stopper. The mixture was heated at 55° C. for 1 hour. After the heating step, in which reaction occurs, the methanol was recovered, at a rate of 65% to 85%, from the reaction mixture. The remainder of the reaction mixture was dissolved in ethyl acetate (500 ml), the solution moved to a separation funnel and washed three times with water (100 ml). The organic phase was then dried with sodium sulfate. After concentration and recovery of the ethyl acetate, at a rate of 65% to 85%, the residual was distilled under vacuum (a pressure of 2 mm Hg) and the fraction in the temperature range of 160° C. to 200° C. was collected biodiesel.

The biodiesel collected was 83.5 g which represented a yield of 55.5% based in the weight of the initial crude tall oil charge.

The above embodiments and examples are given to illustrate the scope and spirit of the present invention. These embodiments and examples will make apparent, to those skilled in the art, other embodiments and examples. Those other embodiments and examples are within the contemplation of the present invention. Therefore, the present invention should be limited only by the appended claims.

What is claimed is:

1. A process of making biodiesel comprising reacting crude tall oil with a $C_1$-$C_6$ alkanol in the presence of an acid catalyst to produce a biodiesel reaction product, said crude tall oil is reacted with said $C_1$-$C_6$ alkanol by refluxing a mixture of said crude tall oil and said $C_1$-$C_6$ alkanol, at a temperature of at least about the boiling temperature of said $C_1$-$C_6$ alkanol, in the presence of said acid catalyst and a water absorbing agent.

2. The process in accordance with claim 1 wherein said reflux is conducted at a temperature in the range of between about 55° C. and about 120° C. over a period of no more than about 2 hours.

3. The process in accordance with claim 2 wherein said reflux occurs at a temperature in the range of about 60° C. and about 110° C. over a period of between about 1 hour and 2 hours.

4. The process in accordance with claim 3 wherein said reflux is conducted at a temperature in the range of between about 65° C. and about 100° C. for a period of about 1 hour.

5. The process in accordance with claim 1 wherein said $C_1$-$C_6$ alkanol is methanol, ethanol or propanol and said acid catalyst is sulfuric acid or hydrochloric acid.

6. The process in accordance with claim 5 wherein said $C_1$-$C_6$ alkanol is methanol and said acid catalyst is sulfuric acid.

7. The process of making biodiesel comprising reacting crude tall oil with an acyl halide in the presence of a $C_1$-$C_6$ alkanol to produce a biodiesel reaction product.

8. The process in accordance with claim 7 wherein said reaction of said crude tall oil and said acyl halide occurs by slow addition of said acyl halide to said crude tall oil in said $C_1$-$C_6$ alkanol at reduced temperature in a closed system followed by heating at a temperature of said $C_1$-$C_6$ alkanol for no more than about 2 hours.

9. The process of in accordance with claim 8 wherein said acyl halide is added to said crude tall oil in said $C_1$-$C_6$ alkanol at a temperature in the range of between about −10° C. and about 10° C. and said heating occurs at a temperature in the range between 25° C. and about 100° C. over a period of between about 30 minutes and about 2 hours.

10. The process in accordance with claim 7 wherein said acyl halide is acetyl chloride or acetyl bromide and said $C_1$-$C_6$ alkanol is methanol, ethanol or propanol.

11. The process in accordance with claim 1 wherein said biodiesel reaction product is (a) contacted with a volume of a polar liquid at least equal to the volume of said biodiesel reaction product wherein a suspension liquid is formed; (b) contacting said suspension liquid with an organic solvent whereby a two-phase liquid mixture, an organic liquid phase and a polar liquid phase, is obtained; (c) removing and recovering said organic solvent from said organic phase by evaporation; and (d) recovering said biodiesel by vacuum distillation of said organic solvent-free product of step (c).

12. The process in accordance with claim 7 wherein said biodiesel reaction product is (a) contacted with a volume of a polar liquid at least equal to the volume of said biodiesel reaction product wherein a suspension liquid is obtained; (b) contacting said suspension liquid with an organic solvent whereby a two-phase liquid mixture, an organic liquid phase and a polar liquid phase, is obtained; (c) removing and recovering said organic solvent from said organic phase by evaporation; and (d) recovering said biodiesel by vacuum distillation of said organic solvent-free product of step (c).

13. The process in accordance with claim 11 wherein said polar liquid is water; said polar liquid phase is an aqueous phase; said extracting agent is ethyl acetate, methylene chloride, ethylene chloride, chloroform, hexane, ether or petroleum ether; and said water is added to said biodiesel reaction product in a volume of up to about three times the volume of said biodiesel reaction product.

14. The process in accordance with claim 12 wherein said polar liquid is water; said polar liquid phase is an aqueous phase; said extracting agent is ethyl acetate, methylene chloride, ethylene chloride, chloroform, hexane, ether or petroleum ether; and said water is added to said biodiesel reaction product in a volume of up to about three times the volume of said biodiesel reaction product.

15. The process in accordance with claim 13 wherein said aqueous phase obtained in said step (b) is contacted at least once with said organic solvent wherein a two-phase liquid mixture is formed and wherein said organic phase in each of said organic solvent contacting steps is added to said organic liquid phase prior to said step (c).

16. The process in accordance with claim 14 wherein said aqueous phase obtained in said step (b) is contacted at least once with said organic solvent wherein a two-phase liquid mixture is formed and wherein said organic phase in each of said organic solvent contacting steps is added to said organic liquid phase prior to said step (c).

17. The process in accordance with claim 15 wherein said volume of water added to said biodiesel reaction product in said step (a) is about double the volume of said biodiesel reaction product; said organic solvent added in said step (b) is ethyl acetate; and said step (b) includes said first contact of said ethyl acetate with said biodiesel reaction product and two additional contacts of said aqueous phase with said ethyl acetate.

18. The process in accordance with claim 16 wherein said volume of water added to said biodiesel reaction product in said step (a) is about double the volume of said biodiesel reaction product; said organic solvent added in said step (b) is ethyl acetate; and said step (b) includes said first contact of said ethyl acetate with said biodiesel reaction product and two additional contacts of said aqueous phase with said ethyl acetate.

* * * * *